Figure 1:
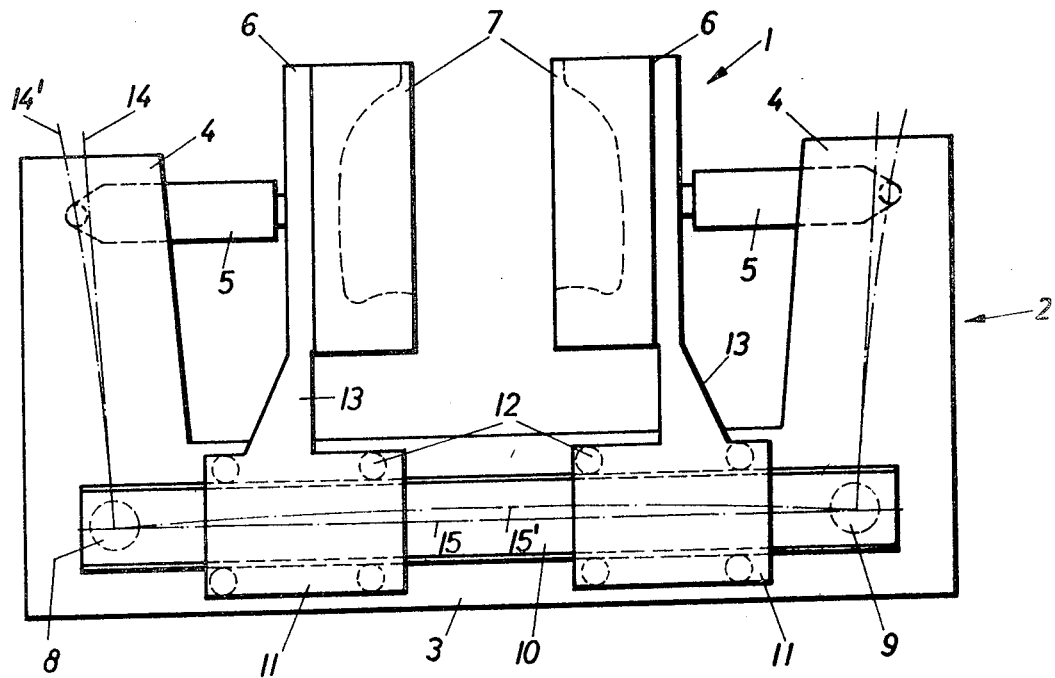

United States Patent [19]
Talasz

[11] 3,734,671
[45] May 22, 1973

[54] MOLD CLOSING UNIT
[75] Inventor: Johann Talasz, 7920 Heidenheim, Germany
[73] Assignee: J. M. Voit GmbH, Heideheim (Brenz), Germany
[22] Filed: Sept. 20, 1971
[21] Appl. No.: 182,057

[30] Foreign Application Priority Data
  Oct. 1, 1970   Germany..................P 20 48 258.0

[52] U.S. Cl..............425/450, 425/326 B, 425/387
[51] Int. Cl................................................B29c 1/16
[58] Field of Search..................425/450, 326 B, 242, 425/387; 249/144, 142

[56]       References Cited
       UNITED STATES PATENTS
3,674,400   7/1972   Sauerbruch et al..............425/242 X FOREIGN PATENTS OR APPLICATIONS
1,209,990   10/1970   Great Britain......................425/387

*Primary Examiner*—J. Howard Flint, Jr.
*Attorney*—Edmund M. Jaskiewicz

[57]       ABSTRACT

A mold closing unit has a substantially U-shaped frame with a pair of guide rails positioned on both sides of the cross member of the frame and having their ends pivotally mounted to the frame below the arms thereof. A pair of mold supports are slideably mounted on said guide rails for movement toward and from each other between the arms of the frame. Closing and blowing forces are absorbed by the frame and deformations in the frame resulting from these forces do not misalign the mold halves which are mounted on the guide rails.

5 Claims, 2 Drawing Figures

MOLD CLOSING UNIT

The present invention relates to a mold closing unit such as employed in forming containers of synthetic resin by a blow molding operation, more particularly, to the structure for moveably supporting the mold half supports on the frame of the unit.

Mold closing units to which the present invention relates have been constructed with a substantially rectangular or closed frame including upper and lower cross members interconnecting vertical arms. Structure has been positioned on the upper cross member both for supporting the weight of the mold supports and the molds and for guiding the mold supports in movement toward and from each other. Such frames have been disadvantageous in large units since it is desirable in these units that the molds be removeable and mountable by means of various lifting apparatus, such as various hoists, cranes, or overhead cranes. However, in such an installation the upper cross member has interferred with such mold lifting operations. It was subsequently proposed to construct the frame with substantially a U-shape wherein the upper cross member was omitted. However, the U-shaped frame was deformed by the relatively high closing forces to a considerably greater extent than in the case of a closed frame structure. The closing forces resulting from the closing of the molds caused the free arms of the U-shaped frame to be bent outwardly and the lower cross member to be curved upwardly. Even if these deformations are relatively small there is still produced an undesirable shifting of the mold halves with respect to each other which is objectionable.

In order to overcome the disadvantage of the U-shaped frame it was proposed to utilize a second U-shaped frame adjacent the first frame which displaceably supported the mold supports on the cross member. The second U-shaped frame absorbed the closing forces and was constructed as an auxiliary device in parallel with the first frame which absorbs the guiding and supporting forces. However, this arrangement was also disadvantageous since there was a duplication of the frame as a result of which the entire unit is extremely expensive and heavy in weight. Such a unit was disclosed in the German Utility Model Patent No. 6,603,197.

It is therefore the principal object of the present invention to provide a novel and improved mold closing unit.

It is another object of the present invention to provide a mold closing unit having a U-shaped frame supporting and guiding the mold supports such that the positions of the mold supports with respect to each other are not shifted by closing forces of the molds.

It is a further object of the present invention to provide in a frame for a mold closing unit a structure for supporting and guiding mold supports which is not deformed by closing forces and which is simple in structure, light in weight and inexpensive in manufacture.

According to one aspect of the present invention there is provided a mold closing unit which is particularly adapted for forming containers of a synthetic plastic material, such as resin, by a blow molding operation. The unit comprises a substantially U-shaped frame having two arms connected at their ends by a cross member. A pair of mold support means for cooperating mold halves are mounted for movement to and from each other between the frame arms and means are provided on the frame for supporting the mold support means and for guiding the mold support means in parallel with respect to each other. The guiding means comprises guide rail means parallel to the direction of movement of the mold support means. The ends of the guide rail means are pivotally mounted on the cross beam of the frame below the frame arms. The guide rail means comprises a pair of guide rails symmetrically positioned on both sides of the cross beam. These guide rails are not subjected to any bending stresses because of deformations of the frame resulting from high closing forces of the mold halves. The support rails thus provide a simple but extremely effective structure for both satisfactory guiding of the mold support means and for supporting the weight of the mold support structure.

Figure 2:
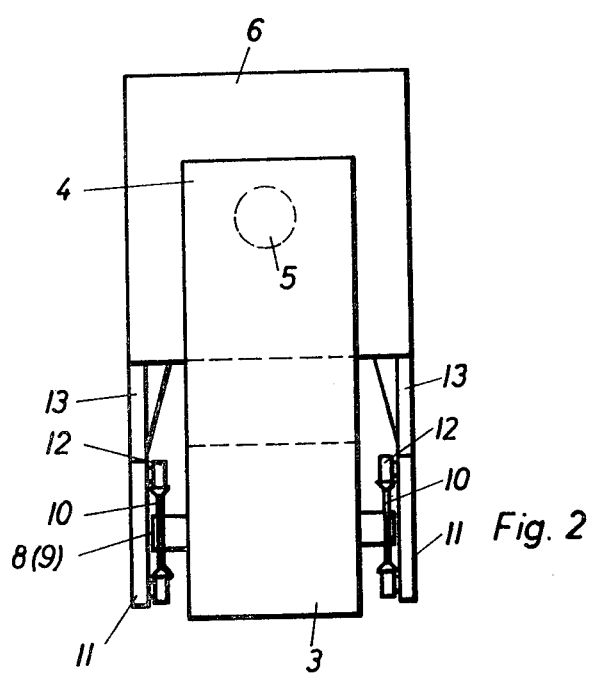

Other objects and advantages of the present invention will be apparent upon reference to the accompanying description when taken in conjunction with the following drawings, which are exemplary, wherein:

FIG. 1 is a front elevational view of the blow molding unit according to the present invention; and FIG. 2 is a side elevational view of the unit illustrated in FIG. 1.

Proceeding next to the drawings wherein like reference symbols indicate the same parts throughout the various views, a specific embodiment of the present invention will be described in detail.

As may be seen in FIGS. 1 and 2, a blow molding unit incorporating the present invention is indicated generally at 1 and comprises a substantially U-shaped or C-shaped frame indicated generally at 2 having a cross member 3 interconnecting the ends of a pair of arms 4. A pair of fluid pressure actuating cylinders 5, hydraulic or pneumatic, are pivotally mounted on the free arms 4 of the frame and are engagable with two mold supports 6 upon which are detachably mounted mold halves 7.

A guide rail 10 is mounted on each side of the cross member 3 as may be seen in FIG. 2 and is pivotally mounted thereon by pins 8 and 9. Two racks or stands 11 upon which the mold supports 6 are mounted by supporting elements 13 are slideably mounted on the guide rails 10 by means of rollers 12 which engage both the upper and lower edges of the guide rails. Each mold support 6 is provided with a pair of supporting elements 13 as may be seen in FIG. 2 so that the mold supports are uniformly positioned on the symmetrically disposed guide rails.

When the frame 2 is subjected to stresses resulting from the closing forces produced by closing of the molds 7 and by the blowing pressures upon closing of the molds, a deformation will appear in the elements in the frame as indicated by the dot-dash lines which correspond approximately to the neutral axes of the elements in question. The deformation, which in reality is relatively small, is indicated in an exaggerated manner in the drawings for purposes of illustrating the invention.

Line 14 corresponds to the neutral axis of free arm 4 and a line 15 corresponds to the neutral axis of the cross member 3 when no loads are placed on these elements of the frame. The lines 14' and 15' correspond respectively to these axes under load conditions. It is pointed out, however, that these deformations of the arms 4 as indicated by the lines 14' and the deformation of the cross member 3 as indicated by the position of the line 15' do not affect the guide rails 10. Thus, the positions of the mold halves 7 when they are closed are not changed in any way by these deformations in the frame since the mold halves are supported completely upon the guide rails. Since the guide rails have their ends pivotally mounted on the frame and support the mold supports 6 and their respective mold halves 7, the mold supports will be guided in precise rectilinear movement so that the mold halves register precisely with each other.

The pivotal mounts of the guide rails 10 are located on the neutral axis 15 of the cross member 3 or on lines extending from this neutral axis. This location of the pivotal connections produces a minimum change in distance between the pivotal connections in the event of deformation of the frame. Further, this variation in distance is well within the permissible range for molding operations.

It is thus apparent that the blow molding unit incorporating the supporting frame of the present invention is a simple conveniently arranged structure whose total weight is relatively low with respect to its function.

It is understood that this invention is susceptible to modification in order to adapt to to different usages and conditions and, accordingly, it is desired to comprehend such modifications within the invention as may fall within the scope of the appended claims.

What is claimed is:

1. In a mold closing unit particularly adapted for forming containers of synthetic resin by a blow molding operation, the combination of a substantially U-shaped frame having two arms connected at their ends by a cross member, a pair of mold support means for cooperating mold halves mounted for movement to and from each other between said frame arms, means on said frame for supporting said mold support means and for guiding said mold support means in parallel with respect to each other, said guiding means comprising guide rail means parallel to the direction of movement of said mold support means, and means on said frame cross beam for pivotally mounting the ends of said guide rail below said frame arms.

2. In a mold closing unit as claimed in claim 1 wherein said guide rail means comprises a pair of rails disposed symmetrically on both sides of said frame cross beam.

3. In a mold closing unit as claimed in claim 1 wherein said pivotal mounting means is mounted on a line along the neutral axis of said cross beam.

4. In a mold closing unit as claimed in claim 1 and comprising a pair of racks slideably mounted on said guide rail means with said mold supporting means being mounted on said racks.

5. In a mold closing unit as claimed in claim 4 wherein each of said racks has roller means thereon riding on the upper edge of said guide rail means.

* * * * *